(12) United States Patent
Miller et al.

(10) Patent No.: US 6,292,837 B1
(45) Date of Patent: Sep. 18, 2001

(54) APPARATUS AND METHOD FOR NON-SEQUENTIAL IMAGE DATA TRANSMISSION AND DISPLAY

(76) Inventors: Daniel Miller, 305 W. 106th St., #4, New York, NY (US) 10025; David Silver, 66 Thomas St., New York, NY (US) 10013; Neil Radisch; Michael Stenzler, both of c/o The Duck Corp., 375 Greenwich St., New York, NY (US) 10013; Gerry Rossi, 431 Beverly Rd., Ridgewood, NJ (US) 07450

(*) Notice: Subject to any disclaimer, the term of this patent is extended or adjusted under 35 U.S.C. 154(b) by 0 days.

(21) Appl. No.: 09/182,996

(22) Filed: Oct. 30, 1998

Related U.S. Application Data

(60) Provisional application No. 60/065,433, filed on Oct. 30, 1997.

(51) Int. Cl.[7] ................................................ G06F 15/16
(52) U.S. Cl. ........................ 709/236; 709/217; 709/231; 709/232; 345/121; 345/126; 345/328
(58) Field of Search ................................. 709/217, 231, 709/232, 236; 345/121, 126, 149, 157, 302, 145, 328, 341, 501, 974; 707/526; 370/506

(56) References Cited

U.S. PATENT DOCUMENTS

| 5,589,945 | * | 12/1996 | Abecassis | 386/83 |
|---|---|---|---|---|
| 5,659,539 | * | 8/1997 | Porter et al. | 709/231 |
| 5,696,869 | * | 12/1997 | Abecassis | 386/52 |
| 5,793,647 | * | 8/1998 | Hageniers et al. | 702/35 |
| 5,828,370 | * | 10/1998 | Moeller et al. | 345/328 |
| 5,903,264 | * | 5/1999 | Moeller et al. | 345/327 |
| 5,930,493 | * | 7/1999 | Ottesen et al. | 348/7 |
| 5,963,203 | * | 10/1999 | Goldberg et al. | 345/328 |
| 6,014,706 | * | 1/2000 | Cannon et al. | 709/231 |
| 6,112,234 | * | 8/2000 | Leiper | 709/219 |
| 6,119,154 | * | 9/2000 | Weaver et al. | 709/219 |
| 6,185,363 | * | 2/2001 | Dimitrova et al. | 386/69 |

* cited by examiner

Primary Examiner—Zarni Maung
Assistant Examiner—Saleh Najjar
(74) Attorney, Agent, or Firm—Levisohn, Lerner, Berger & Langsam

(57) ABSTRACT

An apparatus and method for image display and transmission, including display and transmission of data over the Internet. Image transmission is effected by non-sequential streaming of sequential images or of multiple views of a scene or object. The present invention sends image frames from server to browser out of order. Wherever the cursor is positioned, the browser displays the nearest frame which is received from the server. The viewer, therefore, is able to see more sides of the image without waiting for the entire image to be transmitted.

17 Claims, 4 Drawing Sheets

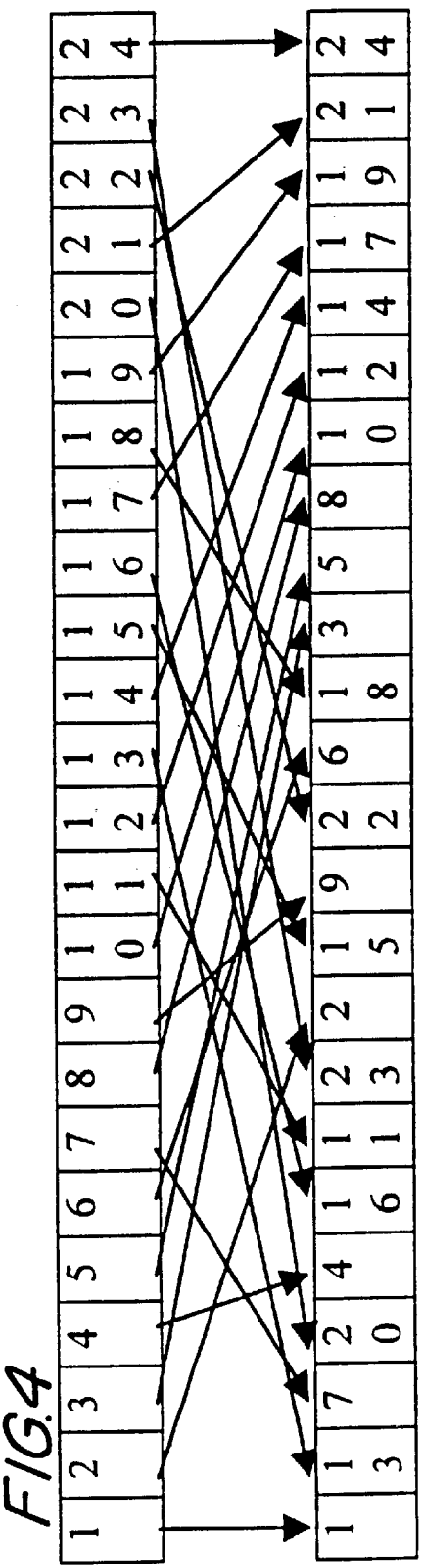
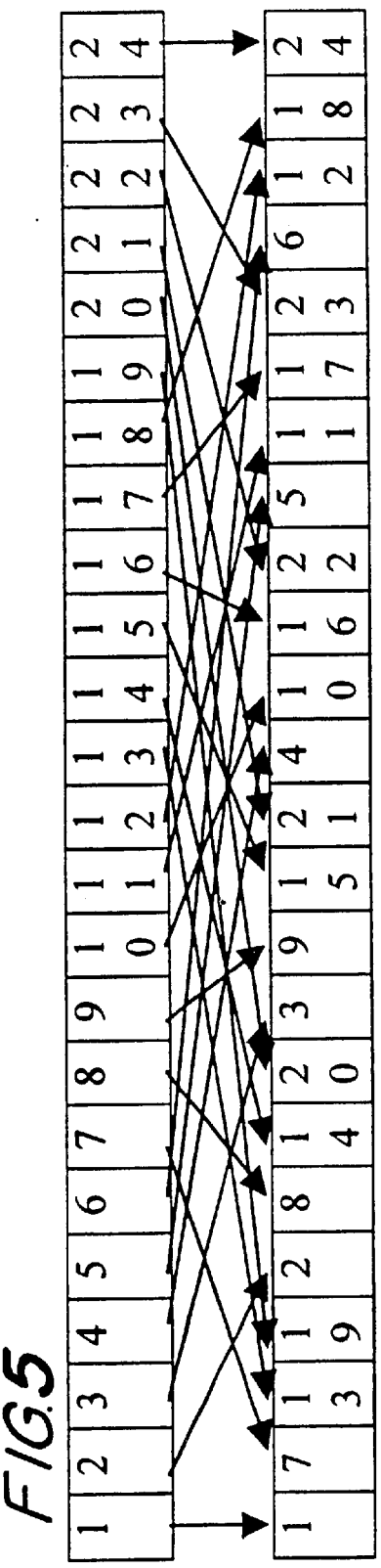
FIG.4
FIG.5

APPARATUS AND METHOD FOR NONSEQUENTIAL IMAGE DATA TRANSMISSION AND DISPLAY

This application claims benefit of Provisional application Ser. No. 60/065,433, filed Oct. 30, 1997.

FIELD OF THE INVENTION

The present invention relates to an apparatus and method for image data transmission and display, including image display and transmission of image data over the Internet.

BACKGROUND OF THE INVENTION

In many applications currently utilized within the art, it is common for graphical or visual data to be transmitted to a user over telecommunications lines such as phone lines. Such image transmissions include transmissions of video images, images of a scene, of a three dimensional object, and so forth. Particularly in low bandwidth environments, image transmission and display can be extremely slow. Accordingly, it is a goal of the present invention to address certain of the drawbacks of the transmission systems used in the present state of the art, while particularly taking into account current bandwidth limitations.

SUMMARY OF THE INVENTION

In accordance with the present invention, an apparatus and method is provided for image display and transmission, including display and transmission of image data over the Internet. Image transmission is effected by nonsequential streaming of sequential images, or or of multiple views of a scene or object. In accordance therewith, rotation of objects or scenes and viewing of multiple perspectives can be accomplished more rapidly, since views can be preliminarily displayed before completion of data streaming (which itself is limited in speed due to the low bandwidth environment). Accordingly, the present invention is particularly useful for transmission of image data over the Internet.

BRIEF DESCRIPTION OF THE DRAWINGS

FIG. 4 is a table illustrating a sample embodiment of the nonsequential streaming of multiple frames, in accordance with the present invention.

FIG. 5 is a second embodiment of the nonsequential streaming disclosed herein.

DETAILED DESCRIPTION OF THE INVENTION AND THE PREFERRED EMBODIMENTS

In accordance with the present invention, a streaming and image display technology is provided for display of images transmitted over telecommunications lines, including phone lines or even satellite transmissions. The invention is particularly suited for low-bandwidth environments such as the Internet. The present invention (also called TrueMotion VR™ or TMVR™ by the present inventors), allows a person viewing a web page ("the viewer") to select and move among the images in a streamed video sequence before all the frames of that video sequence have been transmitted to the viewer. Software based on this technology therefore accepts a stream of video images, and begins displaying those images before receiving all of them. The viewer can then, for example, rotate an object early on during transmission without waiting for the full transmission to be completed. In this way, the viewer can quickly move a cursor over the TrueMotion VR™ image to quickly view an object and gain a better understanding of its shape, color and form in time and space.

In the preferred embodiment, the invention is implemented in software as a Netscape™ client plugin or ActiveX control program; although, alternatively, the technology described herein can be applied in many different environments. In the preferred environment, the program resides within an Internet/Intranet HTML page and displays image frames depending on where the viewer of these images has placed a cursor inside the image on his or her computer screen. This navigation technique allows the content developer to produce images of an object that can be displayed based on the location of a cursor within the image.

Figure 1:
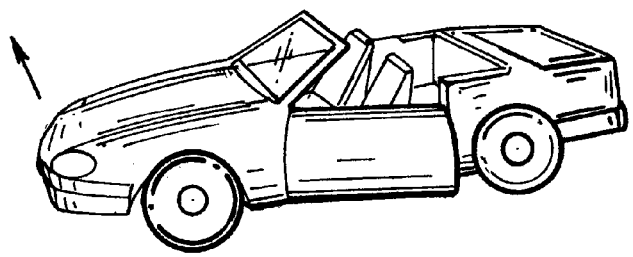
FIG. 1 is a first perspective view of an image for transmission in accordance with the present invention.
Figure 2:
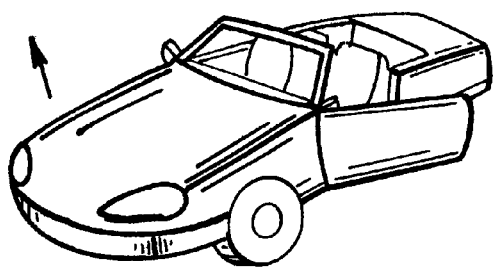
FIG. 2 is a second perspective view of the image of FIG. 1, from a different angle of view than that shown in FIG. 1.
Figure 3:
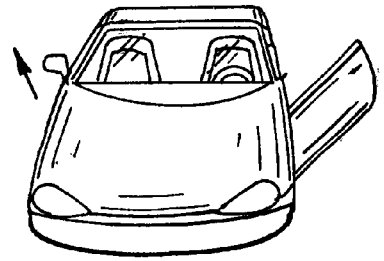
FIG. 3 is a third perspective view of the image of FIG. 1, from a different angle of view than those shown in FIGS. 1 and 2.

The simplest content architecture consists of a series of frames shot from different angles of an object, as shown for example in FIGS. 1–3. The object can be made to appear to rotate from side to side if the viewer moves the cursor right and left. As the cursor moves to the right, the plugin displays images from camera angles progressively to the left so the object appears to rotate to the right. As the cursor moves to the left, the plugin displays images from camera angles progressively to the right so that the object appears to rotate to the left. The images shown in FIGS. 1 through 3, when viewed sequentially, show the cursor moving to the right and the object appearing to rotate to the right.

A more complex content architecture consists of several series of frames called "rows" or "rings". As the cursor moves up and down over the face of the plugin, it displays images from different rings. Depending on the content of the different rings, the image could "zoom" to become larger and smaller as the cursor moves up and down. Alternatively, the camera could appear to move up over the object. Simply changing the way the image is built can allow the content developer to make the image appear to move closer and farther, or to rotate up and down.

In accordance with the present invention, a method for data transmission to the user is provided, which is based on a unique approach to streaming video. A video clip is normally comprised of a linear collection of images (or frames) arranged in time order (i.e. a sequential stream of image frames). Video streaming software transmits the clip from one computer to another. In the method of the prior art, the software transmits the frames of the clip in the same order in which the clip was created. A video player, as it plays these frames in order, gives the impression of coherent motion because frames that are earlier in time are displayed before those that are later in time.

In what the present inventors call ordered streaming, frames are sent from the server computer to the client computer (which is running a browser) in the order that they will be displayed. Frame 1 is followed by Frame 2, Frame 2 is followed by Frame 3, and so forth. For example, with reference to the figures, FIG. 1 would be transmitted first, followed by FIG. 2, then by FIG. 3.

In low bandwidth situations, when it takes a significant length of time to transmit each frame, ordered streaming is not considered by the present inventors to be a sufficiently effective strategy. The transmission medium, typically a fairly slow, analog telephone line, gets clogged up with frames that are similar to one another. Yet the viewer ultimately wants the ability to see all sides of the object as quickly as possible. In accordance with the present invention, it is believed that the viewer would be willing to sacrifice some angular resolution and thus smoothness of motion as the clip of images begins to stream into the browsers.

Accordingly, in the method and software of the present invention, TrueMotion VR™ sends the frames from server to browser in an out of order sequence (i.e. as a non-sequential stream of image frames). Any number of frames can be so transmitted, whether 5, 10, 20, 50, 100, 1000, 10,000, or more frames. Wherever the cursor is positioned, the browser displays the nearest frame that it has received from the server (i.e. the proximal image). When all the frames are received, the browser can display the correct frame; when frames are still arriving, the browser displays the proximal image, i.e. the closest frame that it can. The software modifications required for modification of the known software for conducting transmission and display of images on screen in accordance with the methods of the present invention are well within the skill of one of ordinary skill in the art.

One example of such an out-of-order strategy for 24 frames in the AVI file and one row, reorders the frames from line to scattered. This strategy is shown in FIG. 4. Frames 1 through 24 (as shown on the upper line of the figure) represents the in sequence, or linear order of the complete series of images, while Frames 1, 13, 7, 20, 4, etc. represents the out of sequence order that those images are transmitted to the user. If the Frames 1 through 24, for example, represent views of an object taken at successive angles, the result for the viewer is that all sides of the object can be seen quickly and, as the viewer waits, the angular resolution between "steps" improves.

As an example, we can examine the behavior of the plugin program after four frames have been received by the browser. With an ordered stream, Frames 1, 2, 3 and 4 would be transmitted to the viewer in sequence and the plugin would display:

frame 1 if the cursor was in the left hand 24th of the window (position 1), frame 2 if the cursor was in the second 24th (position 2), frame 3 if the cursor was in the third 24th, frame 4 if the cursor was in the next ⅞ of the screen.

Most of the time, frame four would be displayed. Eventually all of the frames would be transmitted to the user. In the meantime, however, during the transmission period, the overall viewable image would be limited, as shown in the above example.

Figure 6:
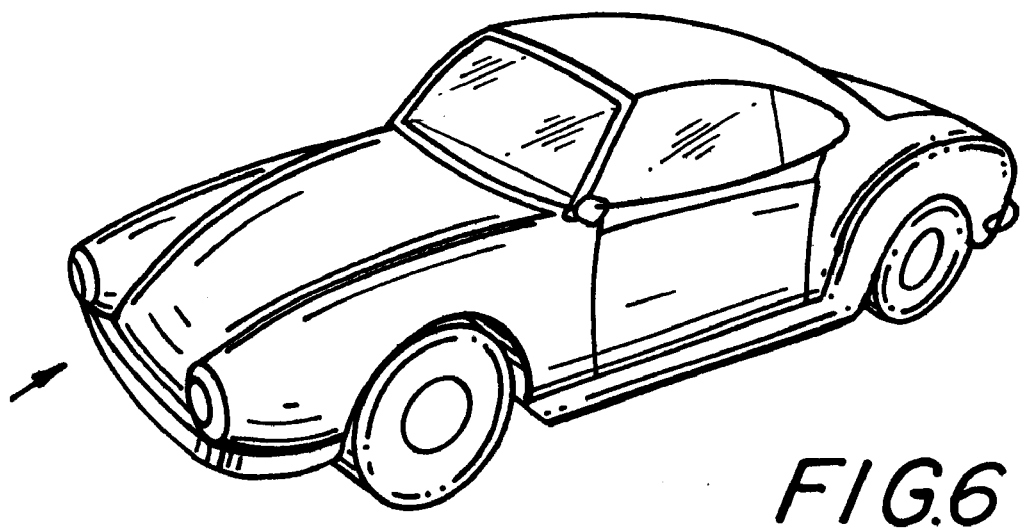
FIG. 6 is a first perspective view of an image transmitted and displayed to the viewer in accordance with the present invention.
Figure 7:
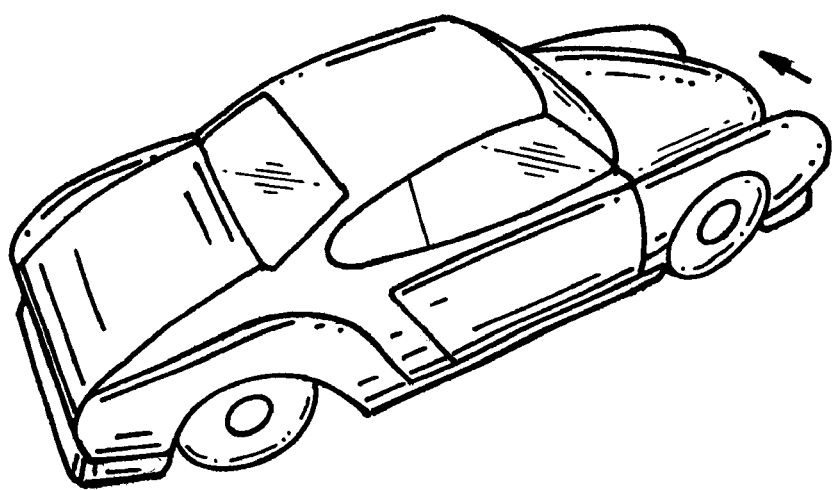
FIG. 7 is a second perspective view of the image of FIG. 1, displayed to the viewer when the cursor is located in the shown position.
Figure 8:
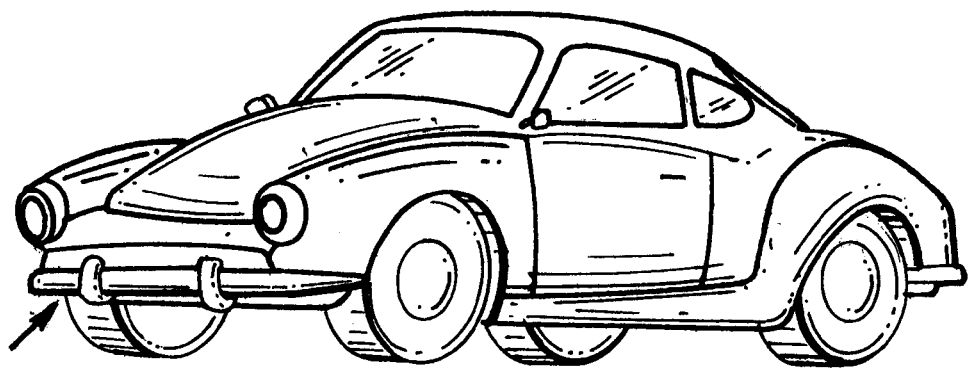
FIG. 8 is a third perspective view of the image of FIG. 1, displayed to the viewer when the cursor is located in the shown position.
Figure 9:
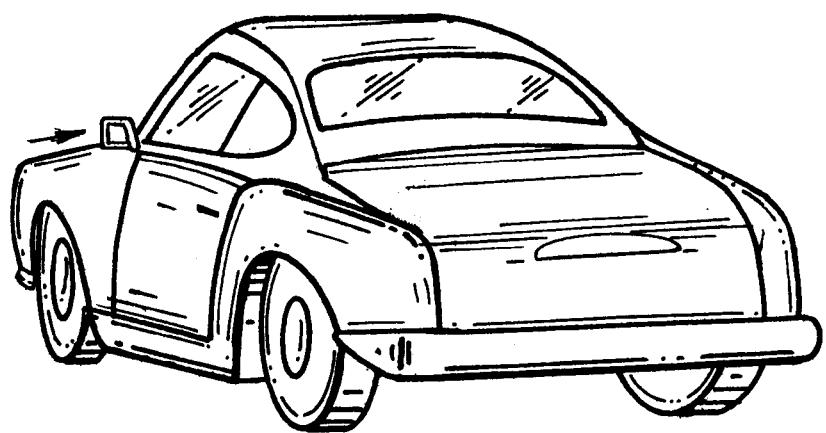
FIG. 9 is a third perspective view of the image of FIG. 1, displayed to the viewer when the cursor is located in the shown position.

With a scattered stream, on the other hand, four out of sequence frames would be transmitted to the user, e.g. Frames 1, 13, 7 and 20, in that order, as shown in FIG. 4. After transmission of the four out of sequence frames, a broad range of angles of the object would be viewable. Specifically, the plugin would display:

frame 1 if the cursor was in positions 1–4, as shown in FIG. 6;

frame 7 if the cursor was in positions 5–10, as shown in FIG. 8;

frame 13 if the cursor was in positions 11–16, as shown in FIG. 7;

frame 20 if the cursor was in positions 17–24, as shown in FIG. 9.

This scattered stream display methodology, therefore, allows the viewer to see more of the object sooner. Although the full series of frames has not yet been transmitted, the viewer nonetheless has a broader spectrum of views available early on than was provided with the ordered stream transmission.

Many other re-ordering strategies are possible. The scattered stream provided above is just one example of a particularly useful scattering of the frames. Another very useful scheme arranges the sequential stream of image frames into subsets of image frames or "slices". In this example, illustrated in FIG. 5, four slices are sent—the first frame of each slice, followed by the second frame of each slice, and so forth. For Frames 1–24, the first slice includes Frames 1–6, the second slice includes Frames 7–12, the third slice includes Frames 13–18, and the fourth slice includes Frames 19–24. Thus, the first four frames transmitted to the user correspond to the first frames of each of the slices, or Frames 1, 7, 13, and 19. Likewise, the next four frames transmitted to the user correspond to the second frames of each of the slices, or Frames 2, 8, 14, and 20. The remaining frames are transmitted in similar fashion. In other words, the linear sequence of images is subdivided into some number of adjacent subsequences or "slices". A first frame is sent from each subsequence or slice, then a second frame from each slice, and so on.

Finally, custom orderings by the content developer can allow particularly interesting viewing angles to be sent early in the stream.

Having described this invention with regard to specific embodiments, it is to be understood that the description is not meant as a limitation since further modifications and variations may be apparent or may suggest themselves to those skilled in the art. It is intended that the present application cover all such modifications and variations.

We claim:

1. A method for transmission of image data over telecommunications lines, comprising the steps of:

(a) providing image data, said image data comprising a sequential stream of image frames;

(b) selecting a first image frame out of said sequential stream of image frames;

(c) selecting further image frames from said sequential stream of image frames to form a non-sequential stream of image frames for transmission to a viewer, wherein the majority of the image frames transmitted in said non-sequential stream of image frames are non-sequential to the previously transmitted image;

(d) transmitting said non-sequential stream of image frames over telecommunications lines;

(e) selecting a proximal image from said non-sequential stream of image frames transmitted to the user, said proximal image being the image nearest to a frame position selected by the viewer, and (f) displaying said proximal image on a viewer's terminal.

2. A method as claimed in claim 1, wherein said non-sequential stream of image frames comprises at least 5 frames.

3. A method as claimed in claim 1, wherein said non-sequential stream of image frames comprises at least 10 frames.

4. A method as claimed in claim 1, wherein said non-sequential stream of image frames comprises at least 20 frames.

5. A method as claimed in claim 1, wherein said non-sequential stream of image frames comprises at least 50 frames.

6. A method as claimed in claim 1, wherein said non-sequential stream of image frames comprises at least 100 frames.

7. A method as claimed in claim 1, wherein said non-sequential stream of image frames comprises at least 1000 frames.

8. A method as claimed in claim 1, wherein said non-sequential stream of image frames comprises at least 10,000 frames.

9. A method as claimed in claim 1, wherein said non-sequential stream of image frames is transmitted through a low bandwidth medium.

10. A method as claimed in claim 1, wherein the first image frame to be transmitted of said non-sequential stream of image frames is the first image frame in said sequential stream of image frames.

11. A method as claimed in claim 10, wherein the second image frame to be transmitted of said non-sequential stream of image frames is the last image frame in said sequential stream of image frames.

12. A method as claimed in claim 1, wherein said sequential stream of image frames corresponds to a sequential series of views of a three dimensional object.

13. A method as claimed in claim 1, wherein said sequential stream of image frames corresponds to a sequence of video.

14. A method as claimed in claim 1, wherein said telecommunications lines are telephone lines, and wherein said image data is transmitted to a viewer over the Internet.

15. A method as claimed in claim 1, wherein said sequential stream of image frames is divided into slices, each of said slices being a subset of said sequential stream of image frames, and further comprising the step of transmitting a frame from each of said slices in said non-sequential stream of image frames before transmitting a second frame from any of said slices.

16. An apparatus for transmission and display of an image, presented as a sequential stream of image frames, transmitted through a low bandwidth medium, comprising:
   (a) means for non-sequentially selecting a series of images frame out of a sequential stream of image frames,
   (b) means for transmitting said non-sequentially selected image frames to the viewer;
   (c) means for locating one of said non-sequentially selected and transmitted images frames nearest to a frame position selected by the viewer; and,
   (d) means for displaying said one located frame on the viewer's terminal.

17. A method for transmission and display of an image, presented as a sequential stream of image frames, transmitted through a low bandwidth medium, comprising the steps of:
   (a) non-sequentially selecting a series of images frame out of a sequential stream of image frames,
   (b) transmitting said non-sequentially selected image frames to the viewer;
   (c) locating one of said non-sequentially selected and transmitted images frames nearest to a frame position selected by the viewer; and,
   (d) displaying said one located frame on the viewer's terminal.

* * * * *